(12) United States Patent
Gilman

(10) Patent No.: US 8,162,336 B1
(45) Date of Patent: Apr. 24, 2012

(54) WIND ACTUATED BICYCLE SAIL

(76) Inventor: Loren L. Gilman, Madison, SD (US)

( * ) Notice: Subject to any disclaimer, the term of this patent is extended or adjusted under 35 U.S.C. 154(b) by 4 days.

(21) Appl. No.: 12/828,770

(22) Filed: Jul. 1, 2010

(51) Int. Cl.
*B62M 1/10* (2010.01)

(52) U.S. Cl. ..................... 280/213; 280/288.4

(58) Field of Classification Search ............ 280/212, 280/213, 214, 288.4, 810; 114/102, 43, 103, 114/102.1, 102.16, 102.29
See application file for complete search history.

(56) References Cited

U.S. PATENT DOCUMENTS

| | | | |
|---|---|---|---|
| 578,411 A | 3/1897 | Lotherington | |
| 639,107 A | 12/1899 | Sorensen | |
| 947,731 A | 2/1909 | Couder | |
| 2,038,166 A * | 4/1936 | Deal | 280/213 |
| 2,443,565 A * | 6/1948 | Land | 280/213 |
| 3,598,075 A * | 8/1971 | Kenney | 114/59 |
| 3,836,176 A | 9/1974 | Ylvisaker | |
| 3,986,722 A | 10/1976 | Patterson | |
| 3,994,508 A | 11/1976 | Danner | |
| 4,441,728 A * | 4/1984 | Schroeder | 280/213 |
| 4,557,495 A * | 12/1985 | Kindermann | 280/213 |
| 4,735,429 A * | 4/1988 | Beck | 280/213 |
| 4,738,460 A | 4/1988 | Alexander | |
| 4,978,140 A * | 12/1990 | Babson | 280/810 |
| 5,806,451 A | 9/1998 | Carn | |
| 5,971,414 A | 10/1999 | Borzage | |
| 6,007,081 A | 12/1999 | Merrill et al. | |
| 6,932,368 B1 | 8/2005 | Zam | |

* cited by examiner

*Primary Examiner* — Tashiana Adams

(57) ABSTRACT

A wind actuated bicycle sail for automatically unfurling a sail assembly to utilize tail winds to facilitate forward movement of a bicycle includes a sail guide member designed for coupling to a bicycle. A sail assembly is coupled to the sail guide member. A sail pivot bracket arm is fixedly coupled to the bicycle and pivotally coupled to the sail assembly. The sail assembly is also slidably coupled to the sail guide member such that the sail assembly moves between an open position and a collapsed position when the sail assembly pivots on the sail pivot bracket arm.

20 Claims, 5 Drawing Sheets

WIND ACTUATED BICYCLE SAIL

BACKGROUND OF THE DISCLOSURE

Field of the Disclosure

The disclosure relates to bicycle wind sails and more particularly pertains to a new bicycle wind sail for automatically unfurling a sail assembly to utilize tail winds to facilitate forward movement of a bicycle.

SUMMARY OF THE DISCLOSURE

An embodiment of the disclosure meets the needs presented above by generally comprising a sail guide member designed for coupling to a bicycle. A sail assembly is coupled to the sail guide member. A sail pivot bracket arm is coupled to the bicycle and fixedly coupled to the sail assembly. The sail assembly is also slidably coupled to the sail guide member such that the sail assembly moves between an open position and a collapsed position when the sail assembly pivots on the sail pivot bracket arm.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
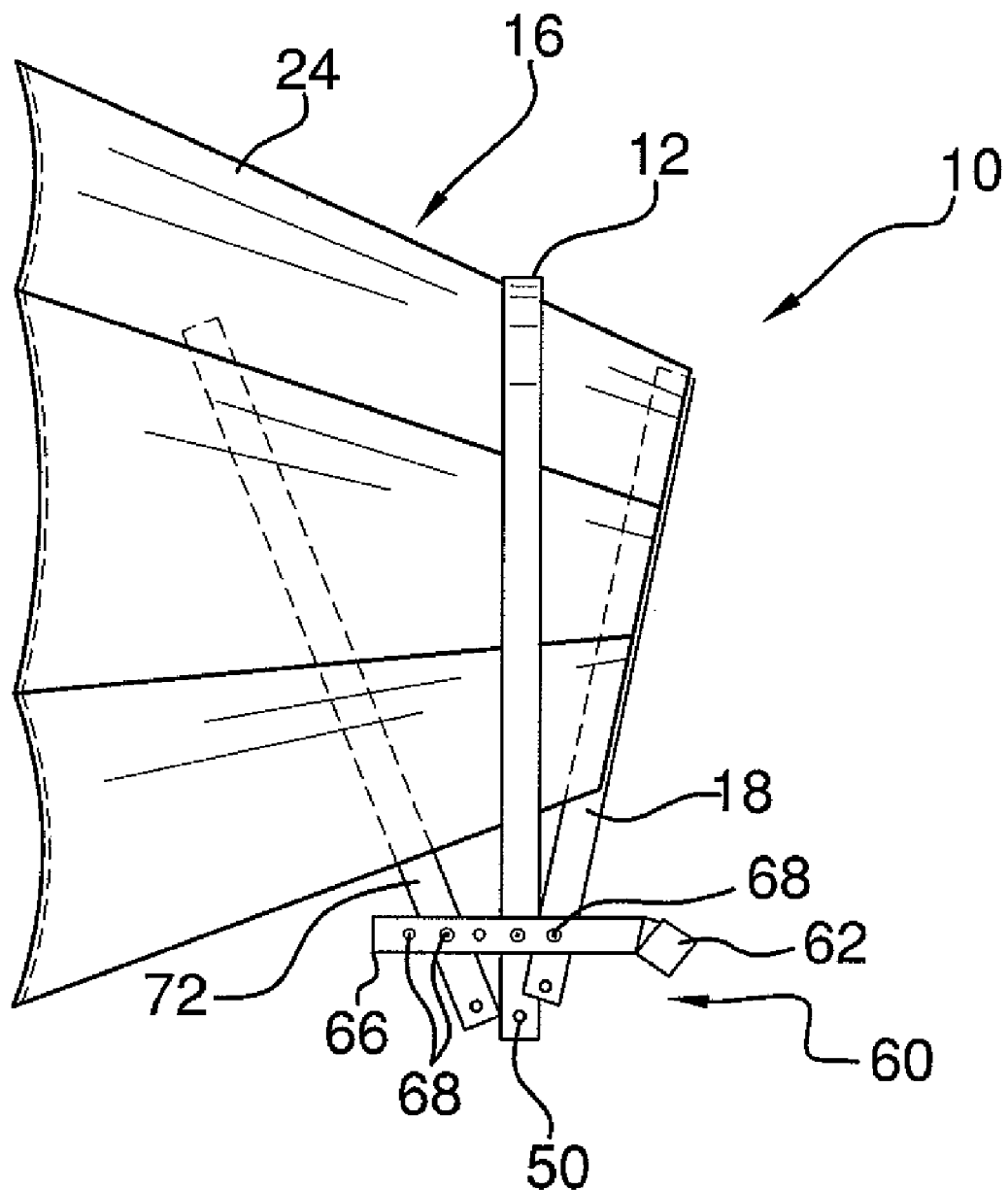
FIG. 1 is a side view of a wind actuated bicycle sail according to an embodiment of the disclosure.
Figure 2:
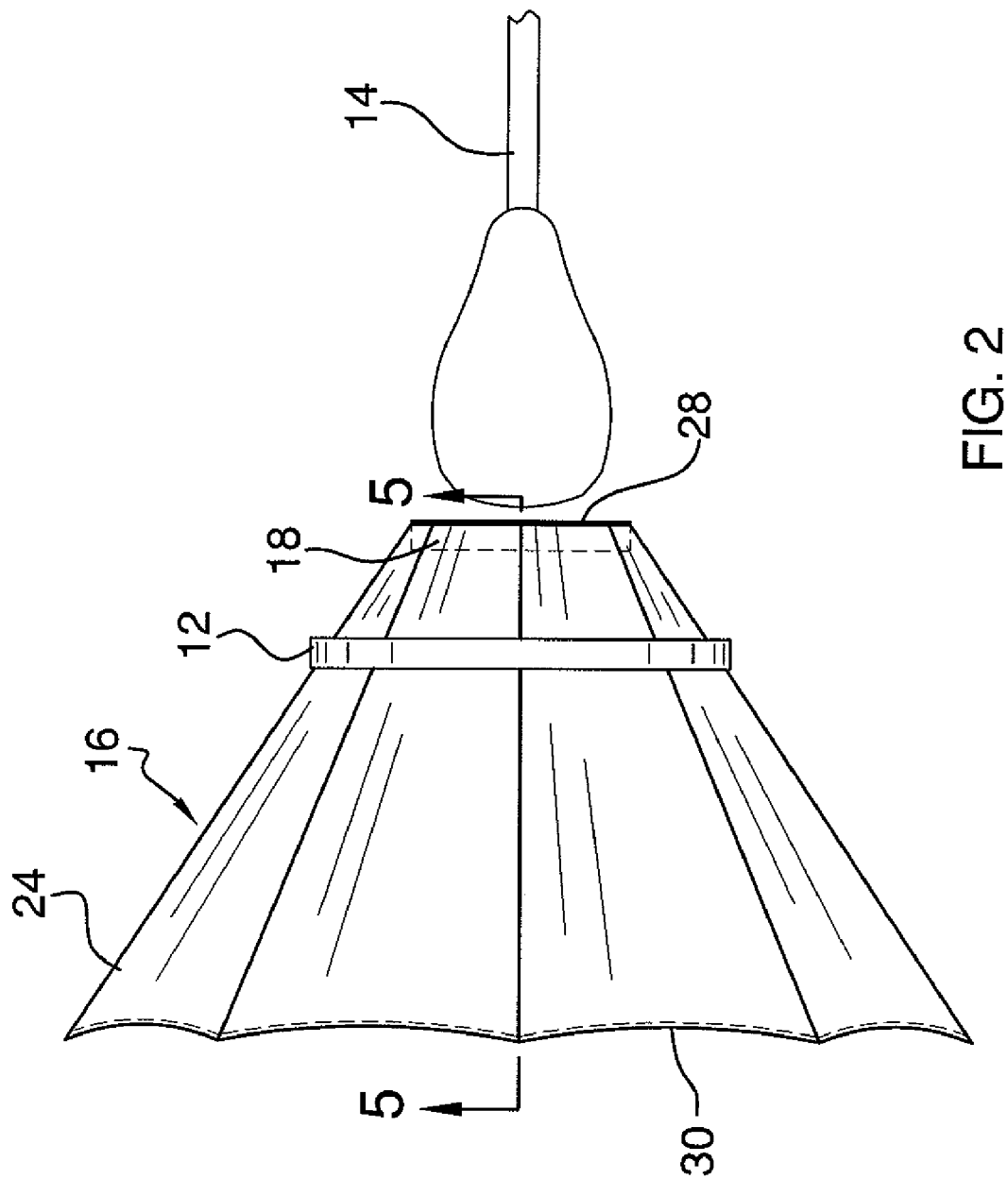
FIG. 2 is a top view of an embodiment of the disclosure.
Figure 4:
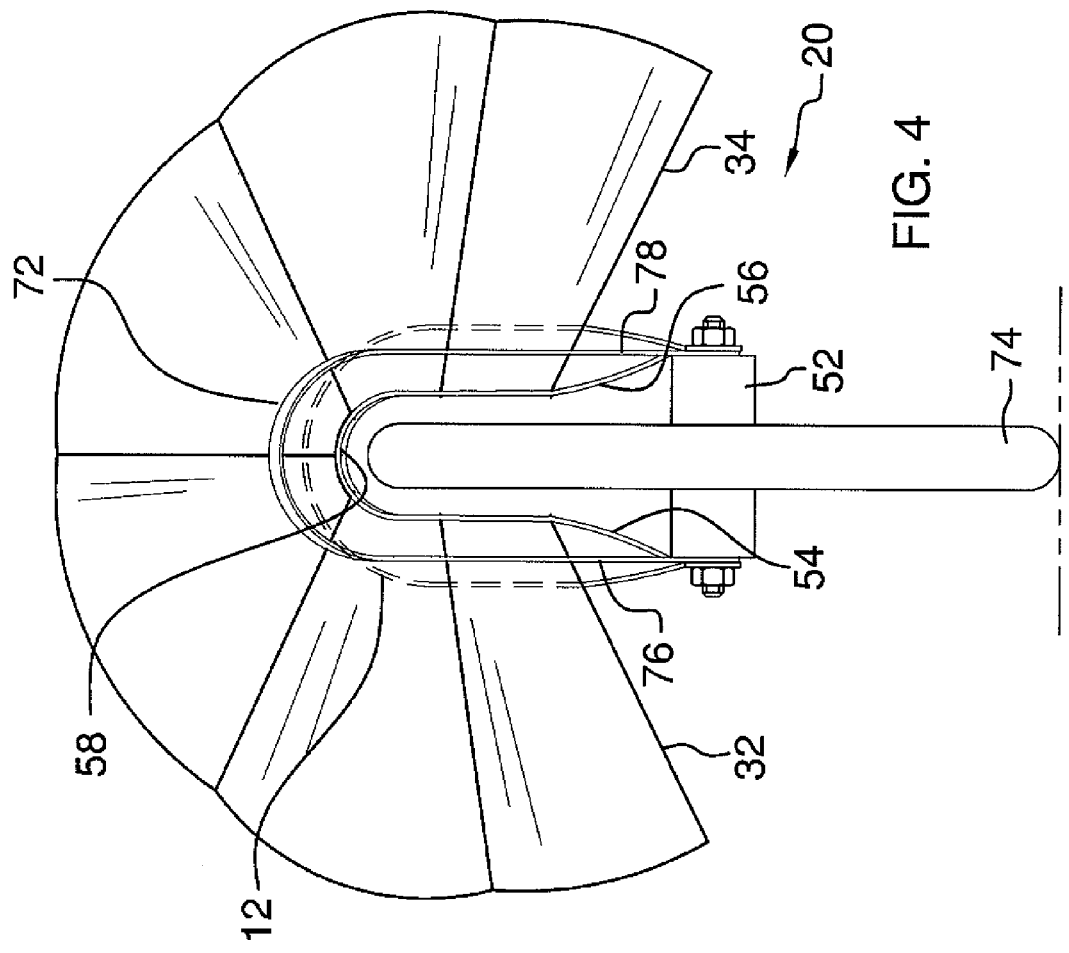
FIG. 4 is a rear view of an embodiment of the disclosure in an unfurled position.
Figure 3:
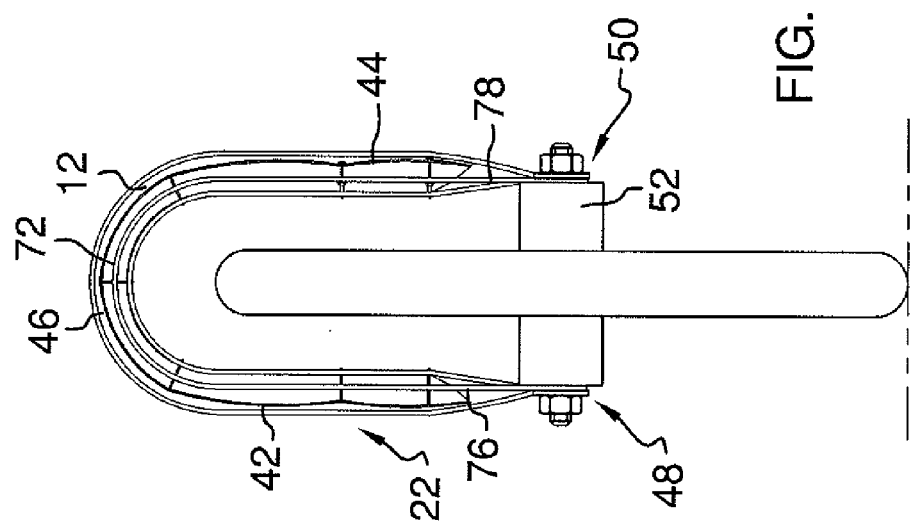
FIG. 3 is a rear view of an embodiment of the disclosure in a collapsed position.
Figure 5:
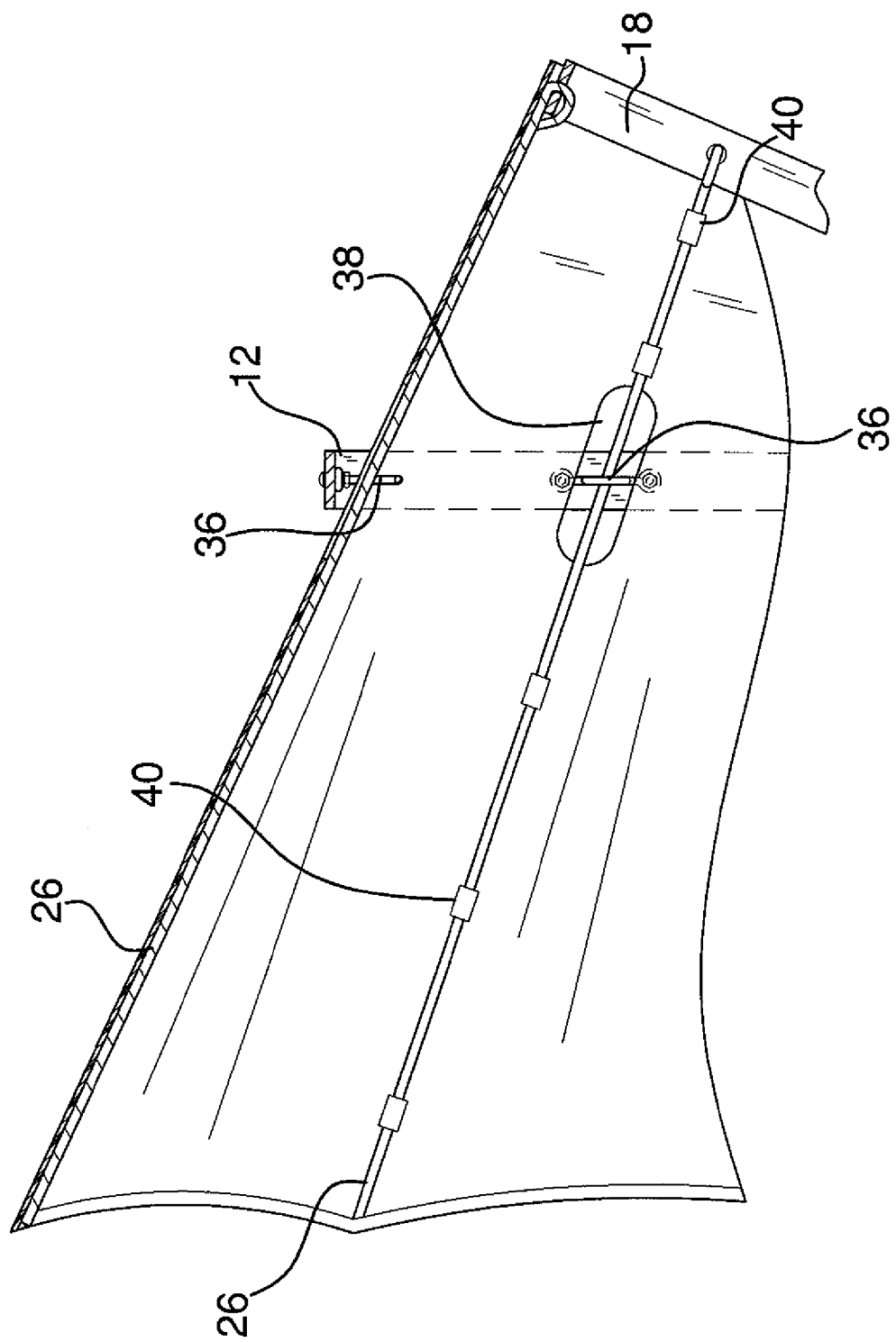
FIG. 5 is a cross-sectional view of an embodiment of the disclosure taken along line 5-5 of FIG. 2.
Figure 6:
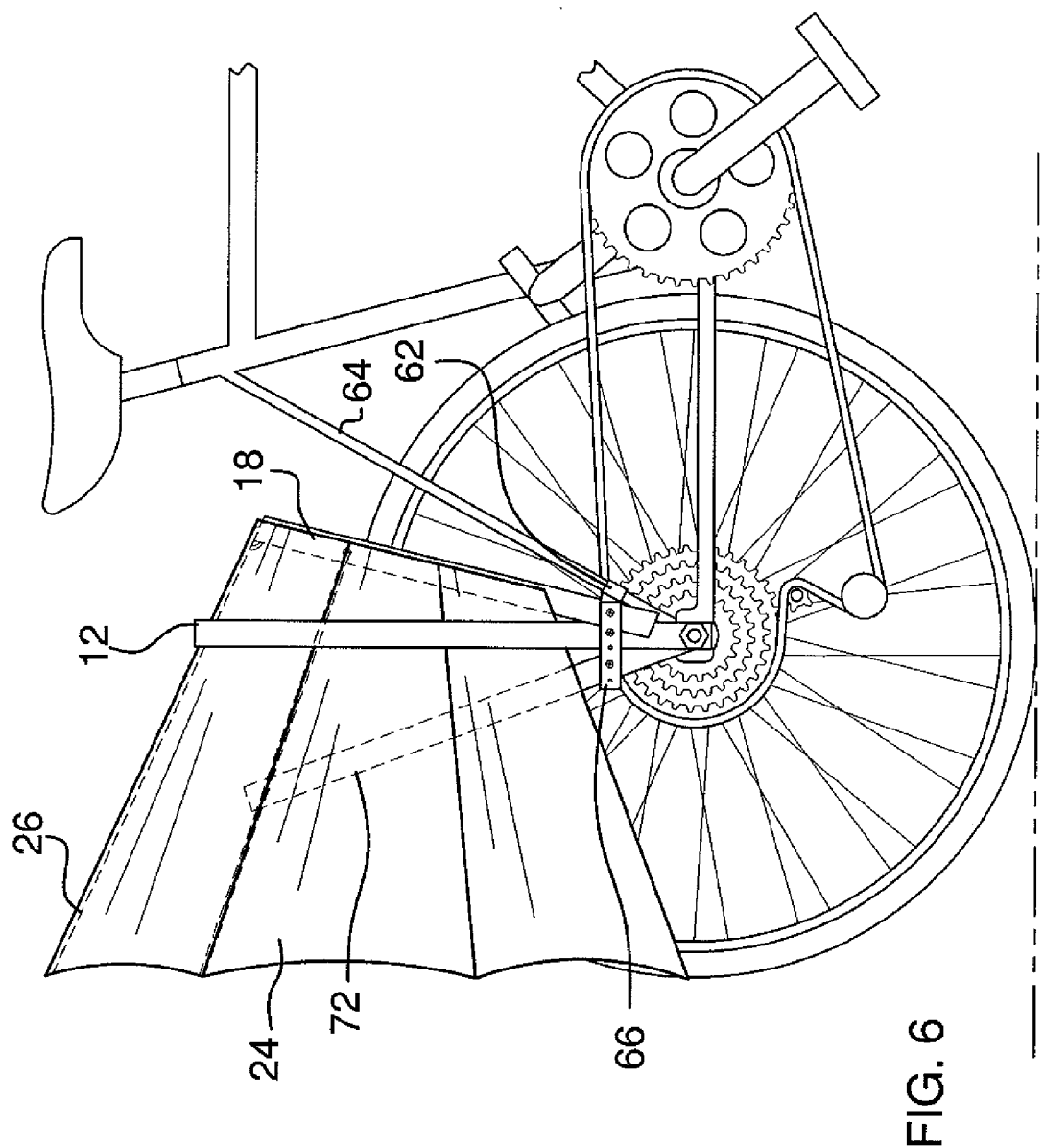
FIG. 6 is a side view of an embodiment of the disclosure in use.

With reference now to the drawings, and in particular to FIGS. 1 through 6 thereof, a new bicycle wind sail embodying the principles and concepts of an embodiment of the disclosure and generally designated by the reference numeral 10 will be described.

As best illustrated in FIGS. 1 through 6, the wind actuated bicycle sail 10 generally comprises a sail guide member 12 designed for coupling to a bicycle 14, a sail assembly 16 coupled to the sail guide member 14, and a sail pivot bracket arm 18 designed for coupling to the bicycle 14. The sail assembly 16 is pivotally coupled to the sail pivot bracket arm 18. The sail assembly 16 is slidably coupled to the sail guide member 12 such that the sail assembly 16 moves between an open position 20 and a collapsed position 22 when the sail assembly 16 pivots relative to the sail pivot bracket arm 18. The sail assembly 16 is positioned on the bicycle 14 to catch a direct tailwind which will expand the sail assembly 16 by pivoting the sail assembly 16 on the sail pivot bracket arm 18.

The sail assembly 16 includes a sail member 24 and a plurality of rigid rods 26 coupled to the sail member 24. The sail member 24 has arcuate edges 28,30 and straight edges 32,34 such that the sail member 24 forms an arch if laid flat. The rigid rods 26 are radially arranged on the sail member 24. Each of the rigid rods 26 passes through a plurality of securing loops 40 coupled to the sail member 24. Thus, each of the rigid rods 26 is coupled to the sail member 24. A plurality of guide loops 36 are coupled to the sail guide member 12. Each of the rigid rods 26 passes through an associated one of the plurality of guide loops 36. The sail member 24 includes a plurality of radially arranged slots 38. The plurality of slots 38 are aligned with the plurality of rigid rods 26. Each guide loop 36 extends inwardly from said sail guide member 12 through a respective one of the plurality of slots 38.

The sail guide member 12 has a pair of straight sail guide end portions 42,44 extending from an arcuate sail guide central portion 46. The sail guide member 12 includes a pair of end apertures 48,50 such that the sail guide member 12 is designed for coupling to a rear axle 52 of the bicycle 14.

The sail pivot bracket arm 18 has a pair of straight sail pivot bracket arm end portions 54,56 extending from an arcuate sail pivot bracket arm central portion 58. A clamp bracket assembly 60 is coupled to the sail pivot bracket arm 18 and the sail guide member 12. The clamp bracket assembly 60 includes a clip portion 62 designed for coupling to a tube 64 of the bicycle 14 proximate the rear axle 52 of the bicycle 14. The clamp bracket assembly 60 includes an attachment portion 66 extending from the clip portion 62. The attachment portion 66 has a plurality of spaced holes 68. The sail pivot bracket arm 18 has an end 82 designed for coupling to the bicycle 14 at or proximate to the rear axle 52. The sail pivot bracket arm 18 is coupled to the attachment portion 66 of the clamp bracket assembly 60 in spaced relationship to the end 82 of the sail pivot bracket arm 18. Thus, the clamp bracket assembly 60 is designed for holding the sail pivot bracket arm 18 in a static position relative to the bicycle 14. The sail guide member 12 is coupled to the attachment portion 66 of the clamp bracket assembly 60. Thus, the clamp bracket assembly 60 is designed for also holding the sail guide member 12 in a static position relative to the bicycle 14.

A sail rest member 72 is designed for positioning between the sail member 24 and a tire 74 of the bicycle 14 to prevent the sail member 24 from contacting the tire 74 when the sail assembly 16 is in the collapsed position. The sail rest member 72 has a pair of straight sail rest end portions 76,78 extending from an arcuate sail rest central portion 80.

The sail guide member 12 has a height greater than the sail pivot bracket arm 18. The sail pivot bracket arm 18 has a height less than the sail rest member 72 such that the sail member 24 is positioned to catch a tailwind to move the sail assembly 16 into the open position 20.

In use, the bicycle sail 10 is coupled to the bicycle 14. The sail assembly 16 rests in the collapsed position 22 while there is either no wind or a crosswind relative to the direction of travel of the bicycle 14. The sail assembly 16 is expanded by pivoting on the sail pivot bracket arm 18 caused by a tailwind putting air pressure on the sail member 24. Pivoting of the sail assembly 16 on the sail pivot bracket arm 18 is restricted by the sail member 24 contacting the sail guide member 12 and the tailwind then exerts force on the bicycle sail 10 to assist in moving the bicycle 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A wind actuated bicycle sail comprising:
    a sail guide member adapted for coupling to a bicycle;
    a sail assembly coupled to said sail guide member;
    a sail pivot bracket arm adapted for coupling to the bicycle, said sail assembly being pivotally coupled to said sail pivot bracket arm; and
    wherein said sail assembly is slidably coupled to said sail guide member such that said sail assembly moves between an open position and a collapsed position when said sail assembly pivots relative to said sail pivot bracket arm
    wherein said sail assembly includes;
        a sail member; and
        a plurality of rigid rods coupled to said sail member, said rigid rods being radially arranged on said sail member.

2. The wind actuated bicycle sail of claim 1, further including a plurality of guide loops coupled to said sail guide member.

3. The wind actuated bicycle sail of claim 2, wherein each of said rigid rods passes through an associated one of said plurality of guide loops.

4. The wind actuated bicycle sail of claim 2, further comprising:
    said sail member including a plurality of radially arranged slots, said plurality of slots being aligned with said plurality of rigid rods;
    wherein each guide loop extends through a respective one of said plurality of slots; and
    wherein each rigid rod passes through a respective one of said guide loops.

5. The wind actuated bicycle sail of claim 1, further including a sail rest member adapted for positioning between said sail member and a tire of the bicycle to prevent said sail member from contacting the tire when said sail assembly is in said collapsed position.

6. The wind actuated bicycle sail of claim 1, wherein said sail guide member has a pair of straight sail guide end portions extending from an arcuate sail guide central portion.

7. The wind actuated bicycle sail of claim 1, wherein said sail pivot bracket arm has a pair of straight sail pivot bracket arm end portions extending from an arcuate sail pivot bracket arm central portion.

8. The wind actuated bicycle sail of claim 1, further including a sail rest member adapted for positioning between said sail member and a tire of the bicycle to prevent said sail member from contacting the tire when said sail assembly is in said collapsed position, said sail rest member having a pair of straight sail rest end portions extending from an arcuate sail rest central portion.

9. The wind actuated bicycle sail of claim 6, wherein said sail guide member includes a pair of end apertures such that said sail guide member is adapted for coupling to a rear axle of the bicycle.

10. The wind actuated bicycle sail of claim 1, further including a clamp bracket assembly coupled to said sail pivot bracket arm and said sail guide member.

11. The wind actuated bicycle sail of claim 10, wherein said clamp bracket assembly further comprises:
    a clip portion adapted for coupling to a tube of the bicycle proximate a rear axle of the bicycle; and
    an attachment portion extending from said clip portion, said attachment portion having a plurality of spaced holes.

12. The wind actuated bicycle sail of claim 11, further comprising:
    said sail pivot bracket arm having an end adapted for coupling to the bicycle;
    said sail pivot bracket arm being coupled to said attachment portion of said clamp bracket assembly in spaced relationship to said end of said sail pivot bracket arm whereby said clamp bracket assembly is adapted for holding said sail pivot bracket arm in a static position relative to the bicycle; and
    said sail guide member being coupled to said attachment portion of said clamp bracket assembly whereby said clamp bracket assembly is adapted for holding said sail guide member in a static position relative to the bicycle.

13. The wind actuated bicycle sail of claim 1, further including each of said rigid rods passing through a plurality of securing loops coupled to said sail member whereby said rigid rods are coupled to said sail member.

14. A wind actuated bicycle sail comprising:
    a sail guide member adapted for coupling to a bicycle;
    a sail assembly coupled to said sail guide member;
    a sail pivot bracket arm adapted for coupling to the bicycle, said sail assembly being pivotally coupled to said sail pivot bracket arm;
    wherein said sail assembly is slidably coupled to said sail guide member such that said sail assembly moves between an open position and a collapsed position when said sail assembly pivots relative to said sail pivot bracket arm;
    wherein said sail assembly includes a sail member;
    wherein said sail assembly includes a plurality of rigid rods coupled to said sail member, said rigid rods being radially arranged on said sail member;
    a plurality of guide loops coupled to said sail guide member;
    wherein each of said rigid rods passes through an associated one of said plurality of guide loops;
    wherein said sail member includes a plurality of radially arranged slots, said plurality of slots being aligned with said plurality of rigid rods;
    wherein each guide loop extends through a respective one of said plurality of slots;
    wherein each rigid rod passes through a respective one of said guide loops;
    a sail rest member adapted for positioning between said sail member and a tire of the bicycle to prevent said sail member from contacting the tire when said sail assembly is in said collapsed position;

wherein said sail guide member has a pair of straight sail guide end portions extending from an arcuate sail guide central portion;

wherein said sail pivot bracket arm has a pair of straight sail pivot bracket arm end portions extending from an arcuate sail pivot bracket arm central portion;

wherein said sail rest member has a pair of straight sail rest end portions extending from an arcuate sail rest central portion;

wherein said sail guide member includes a pair of end apertures such that said sail guide member is adapted for coupling to a rear axle of the bicycle;

a clamp bracket assembly coupled to said sail pivot bracket arm and said sail guide member;

wherein said clamp bracket assembly includes a clip portion adapted for coupling to a tube of the bicycle proximate a rear axle of the bicycle;

wherein said clamp bracket assembly includes an attachment portion extending from said clip portion, said attachment portion having a plurality of spaced holes;

said sail pivot bracket arm having an end adapted for coupling to the bicycle;

said sail pivot bracket arm being coupled to said attachment portion of said clamp bracket assembly in spaced relationship to said end of said sail pivot bracket arm whereby said clamp bracket assembly is adapted for holding said sail pivot bracket arm in a static position relative to the bicycle;

said sail guide member being coupled to said attachment portion of said clamp bracket assembly whereby said clamp bracket assembly is adapted for holding said sail guide member in a static position relative to the bicycle; and wherein each of said rigid rods passes through a plurality of securing loops coupled to said sail member whereby each of said rigid rods is coupled to said sail member.

15. A wind actuated bicycle sail comprising:

a sail guide member adapted for coupling to a bicycle;

a sail assembly coupled to said sail guide member;

a sail pivot bracket arm adapted for coupling to the bicycle, said sail assembly being pivotally coupled to said sail pivot bracket arm;

said sail guide member having a pair of straight sail guide end portions extending from an arcuate sail guide central portion; and wherein said sail assembly is slidably coupled to said sail guide member such that said sail assembly moves between an open position and a collapsed position when said sail assembly pivots relative to said sail pivot bracket arm.

16. The wind actuated bicycle sail of claim 15, wherein said sail assembly further comprises:

a sail member;

a plurality of rigid rods coupled to said sail member, said rigid rods being radially arranged on said sail member; and a plurality of guide loops coupled to said sail guide member.

17. The wind actuated bicycle sail of claim 16, wherein each of said rigid rods passes through an associated one of said plurality of guide loops.

18. The wind actuated bicycle sail of claim 16, further comprising:

said sail member including a plurality of radially arranged slots, said plurality of slots being aligned with said plurality of rigid rods;

wherein each guide loop extends through a respective one of said plurality of slots; and wherein each rigid rod passes through a respective one of said guide loops.

19. The wind actuated bicycle sail of claim 15, further including a sail rest member adapted for positioning between said sail member and a tire of the bicycle to prevent said sail member from contacting the tire when said sail assembly is in said collapsed position.

20. The wind actuated bicycle sail of claim 15, further including a clamp bracket assembly coupled to said sail pivot bracket arm and said sail guide member.

* * * * *